June 20, 1933.  H. G. JORGENSEN  1,915,249
RESILIENT BUFFER
Filed Aug. 31, 1931
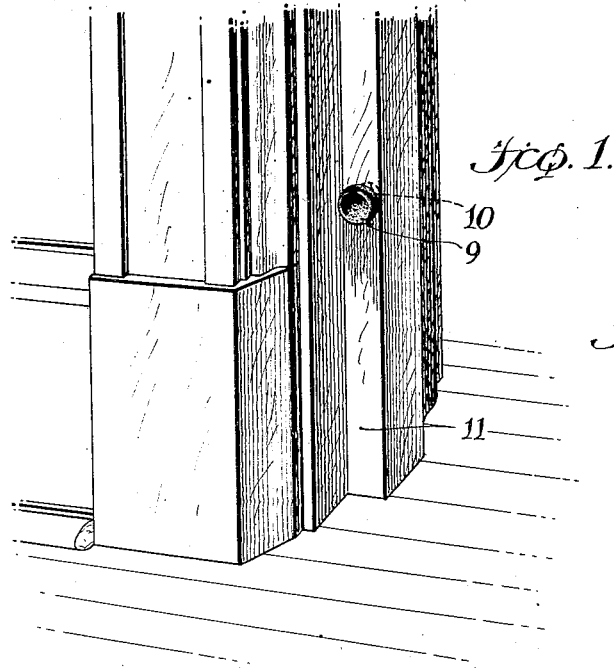
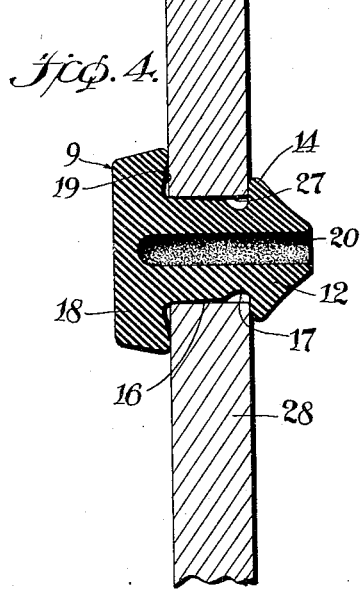
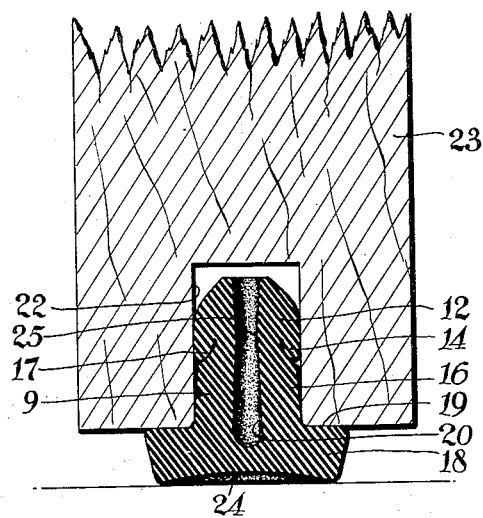
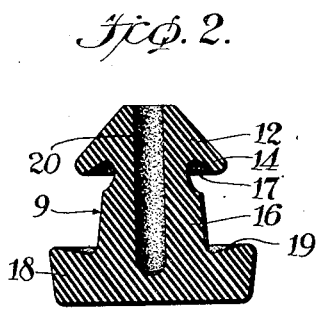
INVENTOR
*Hans Gotfred Jorgensen,*
BY
*Bean, Brooks + Henry.* ATTORNEYS Patented June 20, 1933

1,915,249

UNITED STATES PATENT OFFICE

HANS GOTFRED JORGENSEN, OF ERIE, PENNSYLVANIA, ASSIGNOR TO JORGENSEN SPECIALTY COMPANY, OF ERIE, PENNSYLVANIA

RESILIENT BUFFER

Application filed August 31, 1931. Serial No. 560,518.

This invention relates to resilient buffers or plugs and it has particular relation to a self sustaining buffer which may be snapped through or manually applied to various articles.

A construction embodying the invention comprises primarily a resilient buffer so shaped that it can be inserted into an opening in various kinds of articles, such as furniture legs, door jambs, and the like, where it grips the walls of the opening to prevent it from being displaced. In its operative position the buffer is partially under compression and partially under tension, both the compression and tension serving to maintain it in its proper position in the opening. Also, the buffer is adapted to be inserted entirely through an article and to be maintained therein with buffer portions extending on opposite sides of the material. In both of the applications of the invention mentioned the construction of the buffer in actual practice is the same.

For a better understanding of the invention reference may now be had to the accompanying drawing forming a part of this invention, of which Fig. 1 is a fragmentary perspective of a buffer embodying the invention as applied to a door jamb;

Fig. 2 is a cross-section of the device in its normal condition;

Fig. 3 is a cross-section showing the device applied to a leg of furniture or the like; and Fig. 4 is a cross-section of the device as applied through the wall of a suitable type of material or through a strip of material.

In practicing the invention illustrated by Fig. 1, a buffer or plug 9 is applied in a bored opening 10 of a door jamb 11 thereby preventing noise commonly caused by slamming a door, as well as absorbing shock of the door when it is closed. The inserting end of the buffer is in the form of a conical head 12 defined by an annular flange 14. The central portion of the buffer is in the form of a substantially cylindrical shank 16 and an annular groove 17 is undercut with respect to the flange 14 in such manner that the flange provides a lip overhanging the groove. If desired, the shank may be tapered slightly toward the head 12. It will be observed that the diameter of the shank 16 is greater than the diameter of the annular configuration defining the bottom of the groove 17, but smaller than the maximum diameter of the flange 14. A disk-like base 18 of materially greater diameter than the shank 16 is integral with the latter and has a shoulder 19 adjacent the base of the shank which is slightly dished in its normal form and the end surface of the buffer defining the disk-like head 18 is normally flat. An opening 20 extends axially through the buffer from the extremity of the head 12 to the base, but terminates at a location approximately midway of the thickness of the base 18.

In the application of the invention as shown by Figs. 1 and 3 in which the buffer is installed in the same manner, a bore 22 is provided in a supporting portion of an article of furniture or the like, such as a leg 23. This bore should be formed with a diameter approximately equal to or slightly smaller than the diameter of the shank 16 and the head 12 of the buffer is forced therein as clearly shown by Fig. 3. Thus, the overhanging flange 14 is compressed inwardly and is curved or rolled into compact form under the head 12 in such manner as to fill the groove 17. This compressed condition of the head 12 including the flange 14 provides a firm grip upon the walls of the bore 22.

It will be observed with reference to Fig. 3 that the dished shoulder 19 is compressed flush against the surface of the leg 23 surrounding the bore 22, thus drawing the outer surface of the disk-like base 18 into concave form, as indicated at 24. This configuration which is a result of the resilient material being somewhat tensioned provides for more resilient or springy characteristics of the base 18 than there would be if the base were simply a disk-like form with parallel surfaces. The bore 20 provides for further resiliency and its walls are slightly constricted, as indicated at 25, when the buffer is inserted into an article in the manner shown by Fig. 3. Thus, the maximum compression of the buffer in its operative position is in the zone defined by the head 12 and including the flange 14 whereas the base 18, by virtue of being drawn inwardly to form the concave portion 24 is under tension. Moreover, since the dished shoulder 19 is compressed against the flat surface surrounding the opening 22, withdrawal of the buffer tends to create a vacuum between the dished shoulder and the flat surface thereby providing an additional guard against displacement of the buffer.

In the application of the invention shown by Fig. 4, a buffer 9 is inserted through an opening 27 in a piece of material 28 which has a thickness slightly greater than the length of the shank 16. Thus, the head 12 is pressed trough the opening 27 until the flange 14 snaps over the edge of the material defining the opening on one side of the material, whereas the base 18 engages the edge of the material defining the opening on the other side thereof. Thus, both ends of the buffer may serve as cushions or the buffer can serve to prevent rattling of members between which the material 28 may be inserted.

Although only the preferred forms of the invention have been shown and described in detail, it will be apparent to those skilled in the art that the invention is not so limited but that various changes may be made therein without departing from the spirit of the invention or from the scope of the appended claims.

I claim:

1. A one piece resilient buffer for insertion in an opening of an article comprising a shank portion having an annular groove adjacent one end thereof, a head on the end of the shank portion having flanges adapted to fit snugly into the groove when pressed into the opening, a base integral with the shank and defining a dished shoulder joining the shank whereby the portion of the base opposite the shank is drawn inwardly when the buffer is forced into the opening.

2. A resilient buffer for insertion in an opening of an article comprising a shank portion having an annular groove adjacent one end thereof, a head on the end of the shank portion having flanges adapted to fit snugly into the groove when pressed into the opening, a base integral with the shank and defining a dished shoulder joining the shank whereby the portion of the base opposite the shank is drawn inwardly when the buffer is forced into the opening, said head and shank having a bore extending therein and terminating in the body of the buffer.

3. A buffer for a surface having a recess therein, comprising in its entirety, a one-piece rubber body having a shank, a head at one end of the shank, the head overhanging the shank and adapted to seat on said surface, the seating face of said head being undercut and resilient whereby the head may be flexed to bring the undercut face under tension, flat against said surface for inserting the shank further into the recess, and an annular lip on the opposite end of the shank compressible and foldable against the shank toward the head for introducing the shank into the recess, said lip being resilient and normally acting to expand outwardly against the recessed wall to frictionally engage the same and resist withdrawing movement of the shank under said lip and said undercut head portion cooperating to firmly anchor the buffer in the recess against withdrawal movement, and against the tendency of the undercut portion of said head to move away from said surface and acting to hold the resilient lip pressed outwardly against the recess wall.

4. In combination with a body having a recess therein and a surface surrounding the outer end of the recess, a resilient buffer having a head and a reduced shank extending therefrom, the shank being disposed in the recess and the underside of the head engaging the surrounding surface, said underside of the head being undercut whereby the central portion of the head may be depressed toward the recess to bring said undercut face of the head into flat contact with said surrounding surface, and a peripheral lip on the shank adjacent the inner end thereof compressed against the shank and folded toward the head whereby movement tending to withdraw the shank will expand the lip, said lip being resilient and frictionally pressing outwardly against the wall of the recess to hold the shank against withdrawal from the recess and normally placed under an axial urge, with respect to the shank, by the tendency of said central portion of the head to urge the shank outwardly to remove the adjacent undercut face of the head from engagement with said surrounding surface.

HANS GOTFRED JORGENSEN.